(12) United States Patent
Bell

(10) Patent No.: US 7,900,666 B2
(45) Date of Patent: *Mar. 8, 2011

(54) TIRE AND METHOD OF SECURING AN OBJECT THERETO

(75) Inventor: Thomas W. Bell, Akron, OH (US)

(73) Assignee: Bridgestone Americas Tire Operations, LLC

( * ) Notice: Subject to any disclaimer, the term of this patent is extended or adjusted under 35 U.S.C. 154(b) by 0 days.

This patent is subject to a terminal disclaimer.

(21) Appl. No.: 12/652,447

(22) Filed: Jan. 5, 2010

(65) Prior Publication Data

US 2010/0108222 A1   May 6, 2010

Related U.S. Application Data

(63) Continuation of application No. 11/496,316, filed on Jul. 31, 2006, now Pat. No. 7,658,809, which is a continuation of application No. 10/359,511, filed on Feb. 5, 2003, now Pat. No. 7,108,761.

(60) Provisional application No. 60/357,923, filed on Feb. 18, 2002, provisional application No. 60/405,189, filed on Aug. 21, 2002.

(51) Int. Cl.
*B60C 5/00* (2006.01)
*B60C 19/00* (2006.01)
*B60C 23/20* (2006.01)

(52) U.S. Cl. .................................. 152/152.1; 152/450

(58) Field of Classification Search ............... 152/152.1, 152/450

See application file for complete search history.

(56) References Cited

U.S. PATENT DOCUMENTS 3,260,294 A   7/1966   Campion
4,341,331 A   7/1982   McDougall

FOREIGN PATENT DOCUMENTS

WO   WO 99/41093   8/1999

OTHER PUBLICATIONS

Canadian Office Action from related application CA2476096.
Canadian Office Action, Application No. 2,476,096 Filed Feb. 3, 2003.

*Primary Examiner* — Justin Fischer
(74) *Attorney, Agent, or Firm* — Thomas R. Kingsbury; Fred Zollinger

(57) ABSTRACT

A tire and a method of securing an object thereto includes a two-piece fastening system having a first portion which is applied to an innerliner of a green tire prior to the green tire being cured and a second portion which includes an object, such as a radio frequency identification chip, attached thereto. The first portion of the two-piece fastening system is attached to the innerliner of the tire with an adhesive or by curing. The green tire is then cured and the second portion of the two-piece fastening system with the object attached thereto is then attached to the first portion of the two-piece fastening system. In an alternative embodiment, the object may be sandwiched between the first and second portions of the fastening system.

20 Claims, 3 Drawing Sheets

TIRE AND METHOD OF SECURING AN OBJECT THERETO

CROSS REFERENCE TO RELATED APPLICATIONS

This application is a continuation application claiming priority from U.S. patent application Ser. No. 11/496,316, now U.S. Pat. No. 7,658,809, filed Jul. 31, 2006 which is a continuation of application Ser. No. 10/359,511, filed Feb. 5, 2003, now U.S. Pat. No. 7,108,761 which claims the benefit of U.S. provisional patent application Ser. No. 60/357,923 filed Feb. 18, 2002 and U.S. provisional patent application Ser. No. 60/405,189 filed Aug. 21, 2002; the disclosures of all are incorporated herein by reference.

BACKGROUND OF THE INVENTION

1. Field of the Invention

The invention relates to a tire and a method of securing an object thereto. More particularly, the invention relates to a tire and a method of connecting an electronic monitoring or identification device to the tire. Specifically, the present invention relates to a tire having a device secured to the tire with a mechanical or interference fit connection formed by a method that uses a hook and loop fastening system.

2. Background Information

It is often desirable to attach objects to a tire, and particularly to the innerliner of a tire. One application of such a method is to attach a radio frequency identification tag or chip (RFID) to the innerliner of a tire. These RFID chips store tire identification data, which may then be read from the RFID chip by a remote reader as the tire passes through an assembly line.

Another such application is to secure a pressure and/or temperature-sensing device to the innerliner of the tire. The sensor monitors the pressure and temperature inside of the tire and transmits this data to a receiver located outside of the tire, for example mounted on the vehicle.

One of the difficulties of attaching objects to the innerliner of a tire is that during production of the tire, the innerliner and/or the tire-forming bladder are typically coated with a release agent, such as silicone, to prevent the tire from sticking to the tire-forming bladder during curing of the green tire. The physical and chemical properties of the releasing agent are such that it is designed to prevent adhesion to a surface on which it is applied. Thus making it difficult to attach an RFID chip, sensing device or other object to the innerliner of a tire.

One method that has been attempted in the prior art is to attach the RFID chip or sensing device to the green tire prior to the addition of the releasing agent and prior to curing or vulcanization of the tire. Although this method is adequate for the purpose for which it was intended, subjecting the RFID chip and/or sensing devices to the extreme heat of the vulcanization process can damage the sensitive electronics of these devices. In addition, having an object contacting the inflated tire-forming bladder may damage the tire-forming bladder.

Thus, what is needed is a tire which includes objects attached thereto and a method of securing these objects to the tire.

BRIEF SUMMARY OF THE INVENTION

In one embodiment, the invention provides a method of attaching an object to a tire, including the steps of (a) attaching a first portion of a two-piece fastening system to a green tire; (b) curing the green tire; (c) attaching the object to a second portion of the two-piece fastening system; and (d) attaching the first portion of the two-piece fastening system to the second portion of the two-piece fastening system.

The invention also provides an embodiment wherein the object is connected to the tire by sandwiching the object between the first and second portions of a two-piece fastening system. The first portion of the two-piece fastening system is attached to the tire by an adhesive or by curing.

Another embodiment of the invention provides a tire including a first portion of a two-piece fastening system attached to the tire; a second portion of the two-piece fastening system attached to the first portion of the two-piece fastening system; and an object attached to the second portion of the two-piece fastening system.

BRIEF DESCRIPTION OF THE SEVERAL VIEWS OF THE DRAWINGS

Similar numerals refer to similar parts throughout the specification.

DETAILED DESCRIPTION OF THE INVENTION

Figure 1:
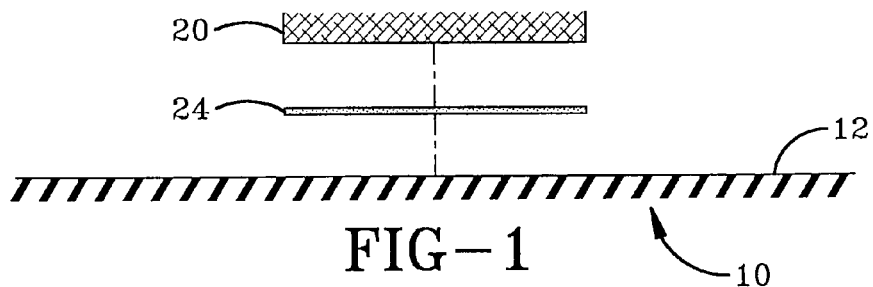
FIG. 1 shows the first portion of a two-piece fastening system being attached to the innerliner of a tire.

A portion of an uncured tire, or green tire, is indicated generally by the numeral 10 in FIG. 1. Tire 10 is formed of a "green" rubber and includes an innerliner 12 that forms the inner surface of tire 10. Innerliner 12 is an air impermeable layer of rubber which, along with a wheel (not shown), forms the air chamber of the tire/wheel combination.

Uncured tire 10 is generally circular in shape and is formed with a hollow interior. Green tire 10 is placed within a tire curing mold wherein the tire is exposed to extreme heat to cure or vulcanize the green rubber. The tire curing mold (not shown) includes a tire forming bladder that expands within the hollow interior of the tire while the tire is cured to retain the tire in its desired shape during curing. This tire forming bladder is formed of a rubber material which allows it to expand and contract into and out of the interior of the tire. To prevent the rubber bladder from adhering to innerliner 12 of tire 10 during the curing process, the tire, the bladder, or both are coated with a release agent, which is preferably a silicone material. The release agent has physical and chemical properties that are designed to prevent adhesion thus making it difficult to attach objects innerliner 12 after tire 10 is cured.

Figure 3:
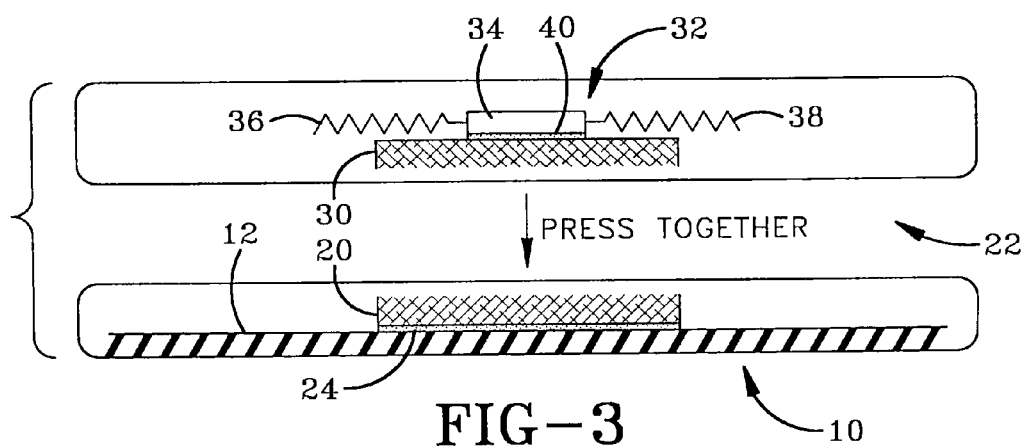
FIG. 3 shows the second portion of the two-piece fastening system, with the RFID chip attached thereto, being attached to the first portion of the two-piece fastening system.

In accordance with the invention, a first portion 20 of a two-piece fastening system or assembly 22 (FIG. 3) is attached to innerliner 12 of green tire 10. First portion 20 may be attached to innerliner 12 using various types of adhesives, and in the preferred embodiment is attached to innerliner 12 with a silicone adhesive 24, such as RTV 382 Silicone Adhesive manufactured by Intek Adhesives Ltd. of Blyth, Northumberland, UK. First portion 20 may also be cured to innerliner 12 during the tire curing process. One method of curing first portion 20 to innerliner 12 is to provide first portion 20 with a portion of uncured rubber that is pressed against the uncured rubber of innerliner 12 before green tire 10 is cured. The portion of uncured rubber will bond to the innerliner during the tire curing process to or attach or connect first portion 20 to innerliner 12.

In either of these attachment methods, first portion 20 is brought into contact with innerliner 12 before innerliner 12 is coated with the release agent. After first portion 20 of the two-piece fastening system 22 is brought into contact with innerliner 12, green tire 10 is placed within the tire-curing mold where the green tire 10 is cured. Innerliner 12 and first portion 20 may then be sprayed with the release agent. In some cases, the bladder may have then release agent. In either situation, the release agent will not degrade the secure connection between first portion 20 and innerliner 12.

Figure 2:
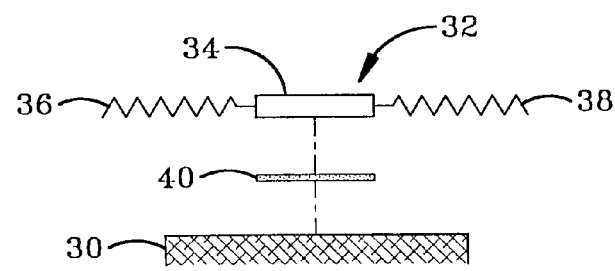
FIG. 2 shows an radio frequency identification (RFID) chip being attached to the second portion of the two-piece fastening system.

A second portion 30 of two-piece fastening system 22 is shown in FIG. 2. In accordance with the invention, a radio frequency identification (RFID) chip or tag 32 is connected to second portion 30. RFID chip 32 includes a chip 34 and two outwardly extending antennae 36 and 38. Second portion 30 may be attached to RFID tag 32 using various types of adhesives, and in the preferred embodiment is attached to RFID 32 using a cyanoacrylate-based adhesive 40. Tag 32 may also be a monitoring-style tag that transmits pressure and temperature information from the tire.

Upon tire 10 being removed from the tire-curing mold, second portion 30 of the two-piece fastening system 22 may be attached to first portion 20 of the two-piece fastening system 22 thus attaching RFID 32 to innerliner 12 of tire 10.

Two-piece fastening system 22 may be any of a number of fastening systems which include first portion 20 which is capable of being subjected to the heat and pressure of the tire-curing mold and second portion 30 which attaches to the object to be secured to the tire. Examples of such a fastening system include but are not limited to a hook-and-loop fastener, such as VELCRO.RTM. brand fasteners (VELCRO is a registered trademark of Velcro Industries B.V. of Castorweg, Netherlands Antilles), or a hook-and-hook fastener or a DUAL LOCK.RTM. low profile reclosable fastener (DUAL LOCK is a registered trademark of Minnesota Mining and Manufacturing of Saint Paul, Minn.). These fastening systems are particularly useful in this application because they include a plurality of small individual connectors that tighten when subjected to vibrations. As such, the connection between tag 32 and the tire will tight when the tire is installed on a vehicle and placed into service. These fastening systems provide first portion 20 that is attached to tire 10 prior to the tire 10 being cured. First portion 20 does not contain a sensitive electronic device that may be damaged during the curing process or any object which may damage the tire-curing bladder. Second portion 30, which is adhered or otherwise attached to the electronic device 32 or object, may then be attached to first portion 20 after first portion 20 has been subjected to the tire curing conditions.

RFID tag 32 stores tire identification information of the tire and is read by a reader that is spaced remotely from the tire as the tire travels through an assembly or production line. First portion 20 of two-piece fastening system 22 is preferably placed in the region of the tread and sidewall junction of the tire, although other locations may be suitable provided RFID tag 32 can be read by the remote reader. Further, the method and tire of the present invention eliminate the problems of the releasing agent preventing adhesion to innerliner 12 of the tire as first portion 20 is attached to innerliner 12 prior to the releasing agent being applied to the inside of tire 10. The silicone adhesive described above allows the releasing agent to be applied to the tire without affecting the bond between first portion 20 of two-piece fastening system 22 and innerliner 12 of tire 10.

In an alternate embodiment, a pressure or temperature sensing device may be attached to second portion 30 of two-piece fastening system 22. Such a sensing device transmits temperature and pressure data of the inner air chamber of the tire to a reader located outside of the tire air chamber. This data may then be transmitted to a driver of the vehicle to notify the driver of a low pressure or high temperature within the tire. The method of the present invention allows sensitive electronic devices, such as pressure or temperature sensors, to be attached to innerliner 12 of a tire without subjecting the electronic devices to the high curing temperatures of the tire.

Figure 4:
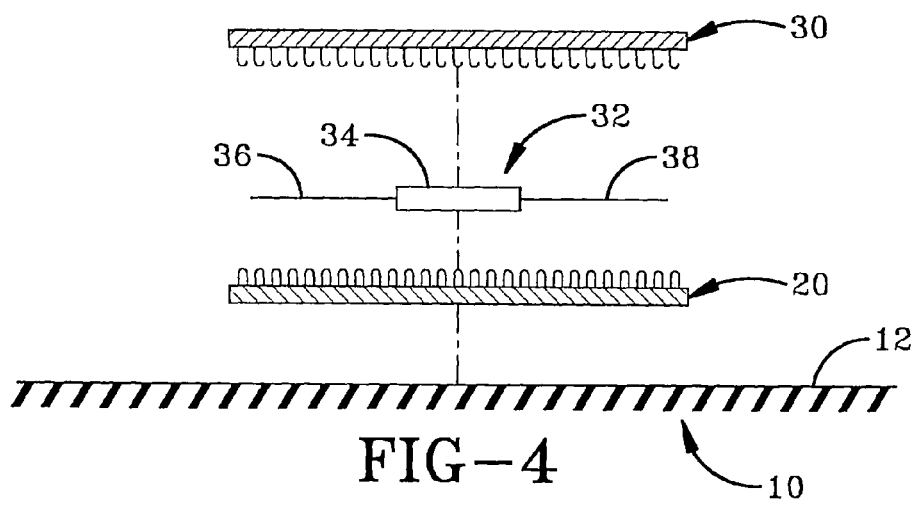
FIG. 4 is an exploded section view of an alternative embodiment of the invention wherein the RFID chip will be sandwiched between the two portions of the two-piece fastening system.
Figure 5:
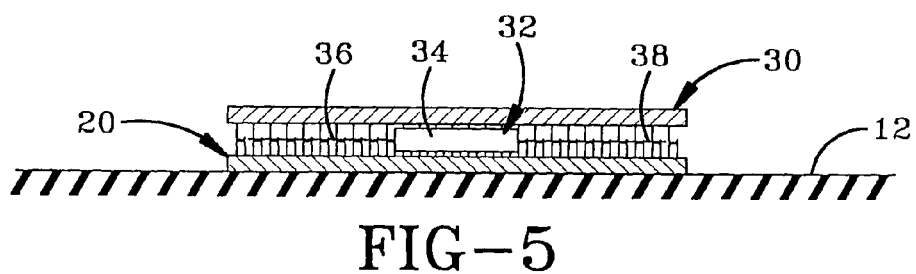
FIG. 5 is a section view of the RFID chip mechanically trapped between the two portions of the two-piece fastening system with the two-piece fastening system connected to the tire.
Figure 6:
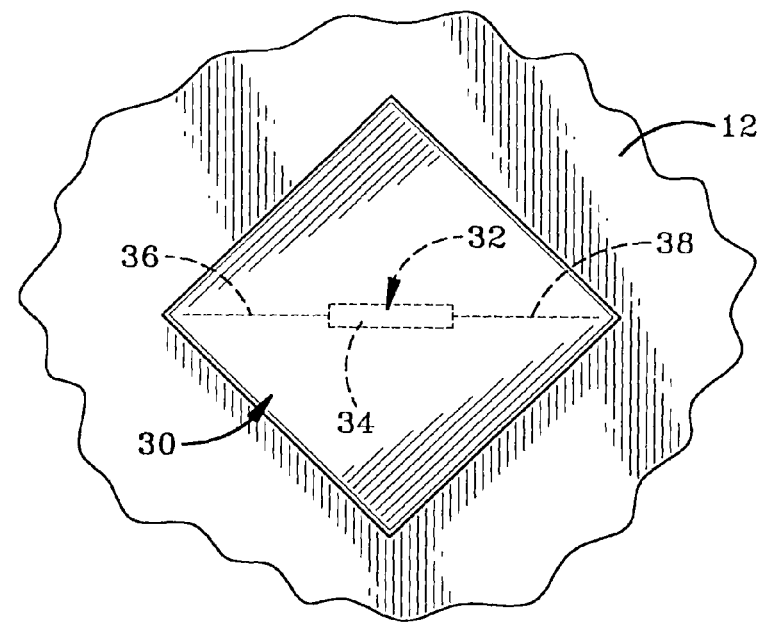
FIG. 6 is a top plan view of the sandwiched RFID chip.

An alternative embodiment of the tire and method of the invention is depicted in FIGS. 4-6. In this embodiment, RFID tag 32 or the sensor is sandwiched between first portion 20 and second portion 30 of system 22 such that RFID tag 32 is mechanically trapped between portions 20 and 30. Although the drawings depict a hook and loop fastening system with first portion 20 being loops, portions 20 and 30 may be switched so that loops 20 are used with second portion 30. In this embodiment, first portion 20 is connected to innerliner 12 in one of the manners described above. After tire 10 is cured, RFID tag is positioned between portions 20 and 30 such that tag 32 is sandwiched between the two portions where tag 32 cannot be removed without detaching portion 30 from portion 20. An advantage to this embodiment over prior art connection methods is that portion 30 may be flexible so that it can accommodate tag 32 when portion 30 is placed over the top of tag 32.

Figure 7:
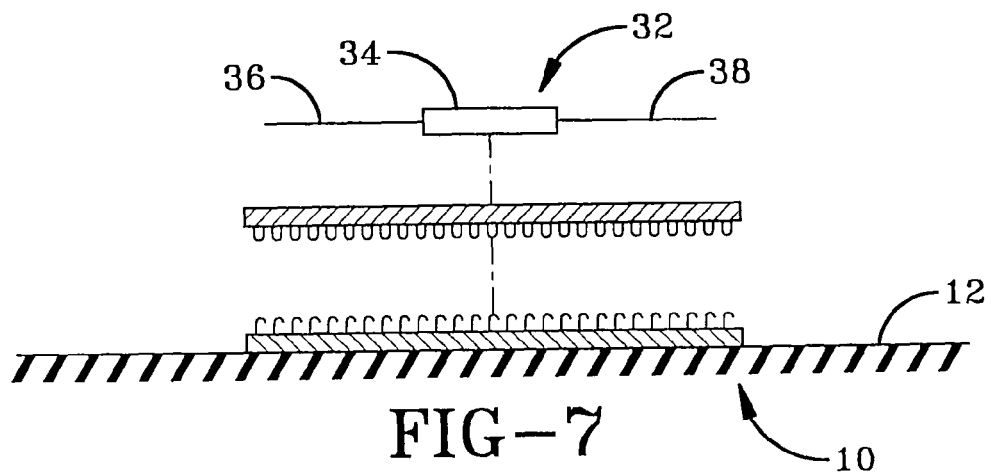
FIG. 7 is an exploded section view of an alternative embodiment of the invention wherein the RFID chip will be connected to the outwardly facing surface of the two-piece fastening system and encapsulated with an encapsulation material.
Figure 8:
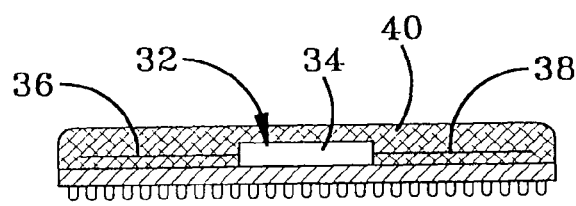
FIG. 8 is a section view of the RFID chip secured to the outwardly facing surface of the second portion of the two-piece fastening system with the encapsulation material.
Figure 9:
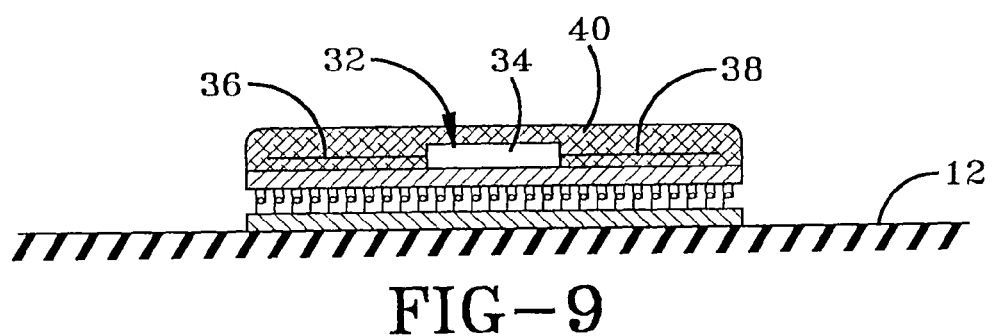
FIG. 9 is a section view of the RFID chip secured to the two-piece fastening system which is secured to the tire.

An alternative embodiment is depicted in FIGS. 7-9 wherein tag 32 is connected to second portion 30 with an encapsulation material 40. Encapsulation material 40 may be any of a variety of materials such as epoxies, adhesives, rubbers, plastics, or thermoplastics that can surround tag 32 and attach tag 32 to second portion 30. Encapsulation material 40 may be used to protect tag 32 from the environment inside the cured tire while securely holding tag 32 to second portion 30. One advantage of encapsulation material 40 is that its rigidity may be controlled to protect tag 32 from damage while allowing system 22 to flex with the cured tire.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A tire comprising:

a tire body having an innerliner;

a first portion of a two-piece mechanical fastening system attached to the innerliner of the tire body; the first portion of the two-piece mechanical fastening system having a plurality of small connectors;

a second portion of the two-piece mechanical fastening system attached to the first portion of the two-piece mechanical fastening system; the second portion of the two-piece mechanical fastening system having a plurality of small connectors;

an object disposed between the first and second portions of the two-piece mechanical fastening system; a portion of the small connectors of each of the first and second portions of the two-piece mechanical fastening system engaging the object; and the object being one of a radio frequency chip and a tag.

2. The tire of claim 1, wherein the plurality of small connectors of the first and second portions of the two-piece mechanical fastening system cooperate to surround the object.

3. The tire of claim 1, wherein the object includes a chip and an antenna extending outwardly from the chip.

4. The tire of claim 1, wherein the two-piece mechanical fastening system is one of a hook-and-loop fastener and a hook-and-hook fastener.

5. The tire of claim 1, wherein the tag includes a pressure sensor.

6. The tire of claim 1, wherein the tag includes a temperature sensor.

7. The tire of claim 1, wherein the radio frequency chip is an RFID chip.

8. The tire of claim 1, wherein the second portion of the two-piece mechanical fastening system is removable and replaceable on the first portion of the two-piece mechanical fastening system.

9. A tire comprising:
a tire body;
a first portion of a two-piece mechanical fastening system attached to the tire body; the first portion of the two-piece mechanical fastening system having a plurality of small connectors;

a second portion of the two-piece mechanical fastening system attached to the first portion of the two-piece mechanical fastening system; the second portion of the two-piece mechanical fastening system having a plurality of small connectors;

an object disposed between the first and second portions of the two-piece mechanical fastening system; a portion of the small connectors of each of the first and second portions of the two-piece mechanical fastening system engaging the object; and the object being one of a radio frequency chip and a tag.

10. The tire of claim 9, wherein the plurality of small connectors of the first and second portions of the two-piece mechanical fastening system cooperate to surround the object.

11. The tire of claim 9, wherein the object includes a chip and an antenna extending outwardly from the chip.

12. The tire of claim 9, wherein the two-piece mechanical fastening system is one of a hook-and-loop fastener and a hook-and-hook fastener.

13. The tire of claim 9, wherein the tag includes a pressure sensor.

14. The tire of claim 9, wherein the tag includes a temperature sensor.

15. The tire of claim 9, wherein the radio frequency chip is an RFID chip.

16. The tire of claim 9, wherein the second portion of the two-piece mechanical fastening system is removable and replaceable on the first portion of the two-piece mechanical fastening system.

17. A tire comprising:
a tire body;
a first portion of a two-piece mechanical fastening system attached to the tire body; the first portion of the two-piece mechanical fastening system having a plurality of small connectors;

a second portion of the two-piece mechanical fastening system attached to the first portion of the two-piece mechanical fastening system; the second portion of the two-piece mechanical fastening system having a plurality of small connectors;

a plurality of the small connectors of the first and second two being directly engaged to connected the second portion of the two-piece mechanical fastening system to the first portion of the two-piece mechanical fastening system;

an object carried by the attached first and second portions of the two-piece mechanical fastening system; and the object being an electronic device.

18. The tire of claim 17, wherein a portion of the object is surrounded by an encapsulation material.

19. The tire of claim 18, wherein the object is one of a radio frequency identification chip and a tag.

20. The tire of claim 17, wherein the tire body includes an innerliner; the first portion of the two-piece mechanical fastening system being connected to the innerliner.

* * * * *